United States Patent [19]
Behlke

[11] Patent Number: 4,864,136
[45] Date of Patent: Sep. 5, 1989

[54] PASSIVE INFRARED DETECTION SYSTEM WITH THREE-ELEMENT, SINGLE-CHANNEL, PYROELECTRIC DETECTOR

[75] Inventor: George E. Behlke, Farmington, N.Y.

[73] Assignee: Detection Systems, Inc., Fairport, N.Y.

[21] Appl. No.: 188,976

[22] Filed: May 2, 1988

[51] Int. Cl.[4] .............................................. G01J 5/20

[52] U.S. Cl. ................................ 250/338.3; 250/342; 250/349

[58] Field of Search ...................... 250/338.3, 342, 349

[56] References Cited

U.S. PATENT DOCUMENTS

| | | | |
|---|---|---|---|
| 3,453,432 | 7/1969 | McHenry | 250/338.3 |
| 3,703,718 | 11/1972 | Berman | 340/567 |
| 4,225,786 | 9/1980 | Perlman | 250/342 |
| 4,284,888 | 8/1981 | Appleby | 250/338.3 |
| 4,612,442 | 9/1986 | Toshimichi | 250/353 |
| 4,614,938 | 9/1986 | Weitman | 340/567 |
| 4,764,755 | 8/1988 | Pedtke et al. | 340/541 |

*Primary Examiner*—Constantine Hannaher
*Attorney, Agent, or Firm*—Warren W. Kurz

[57] ABSTRACT

A passive infrared detection system embodies a new three-element, single-channel, pyroelectric detector. For a given amount of motion by a target in a region under surveillance, the detector provides more complex signature information than conventional two-element detectors, thereby allowing the target to be more readily distinguished from spurious environmental or background sources. Owing to the geometry of the detector electrodes, the false-alarming effects produced by spurious stimuli common to all detector elements are reduced. The detector is particularly adapted for use in infrared detection systems of the type which use pulse-counting techniques to distinguish targets of interest from non-targets.

20 Claims, 2 Drawing Sheets

PASSIVE INFRARED DETECTION SYSTEM WITH THREE-ELEMENT, SINGLE-CHANNEL, PYROELECTRIC DETECTOR

BACKGROUND OF THE INVENTION

This invention relates to improvements in "presence" detection systems of the so-called "passive infrared" variety which sense the presence of an animate object (e.g. an intruder or pedestrian) in a region under surveillance by sensing the infrared radiation (body heat) given off by such object. Moreover, it relates to improvements in pyroelectric detectors of the type used in such systems.

Whether for the purpose of sounding an alarm in response to unauthorized entry, automatically opening a door in a store or airport as a pedestrian approaches, controlling a "walk" sign at a street corner, etc., it is known to detect the presence or proximity of a human being (or other animal) in a region under surveillance by detecting the minute changes in temperature of such region occasioned by his sudden presence in the region. The "passive infrared" detection systems used to detect such changes typically comprise a pyroelectric detector adapted to provide an output signal proportional to the rate of change of infrared (IR) radiation incident thereon, an optical system for focusing IR radiation emanating from the region under surveillance onto the detector, and some sort of signal processing circuitry for distinguishing the changes in detector output produced by the object of interest from those changes produced by spurious background sources.

Pyroelectric detectors of the type used in passive IR detection systems commonly comprise one or more matched pairs of detector elements. Each element of the pair comprises two spaced parallel electrodes having a pyroelectric member, such as a polyvinylidene fluoride film, sandwiched therebetween. When subjected to a change in temperature, the pyroelectric member causes a signal to appear between its associated electrodes. A matched pair of detector elements, connected in opposition so as to produce identical signals of opposite polarity in response to a given change in temperature, affords the advantage of common mode rejection of spurious signals. The pyroelectric elements of each detector pair are usually arranged very close together so that both elements of a given detector pair "see" the same target at substantially the same time. Whereas only one pair of detector elements is used in passive infrared detection systems to provide narrow, so-called "corridor" protection, multiple pairs of detector elements arranged, for example, in a linear array are sometimes used in such systems to provide broad coverage. See, for example, the detectors disclosed in the commonly assigned U.S. Pat. No. 4,225,786, issued to D. E. Perlman. Of course, even a single detector can provide broad coverage when combined with a multifaceted optical system, such as disclosed, for example, in U.S. Pat. No. 3,703,718, issued to H. L. Berman.

In the never-ending struggle to rid false-alarms from passive infrared detection systems, some have taken a "redundancy" approach in which an alarm signal is produced only in the event two independent detection systems sense the same event or target substantially simultaneously. For example, in U.S. Pat. No. 4,614,938, issued to I. Weitman, there is disclosed a dual channel pyroelectric intrusion detection system comprising two pair (i.e. a total of four) of pyroelectric detector elements. The detector elements are interlaced so that the fields of view of one detector pair is, as nearly as possible, the same as the fields of view of the other detector pair. The respective outputs of the two detector pairs are processed independently and, only in the event both detector pairs provide an alarm output substantially simultaneously, is an alarm produced. While the redundancy inherent in this type of system affords considerable immunity from false alarms, it does so at the expense of requiring an additional detection system.

Another technique for minimizing false alarming in passive IR detection systems is the pulse-counting technique disclosed, for example, in U.S. Pat. No. 4,612,442, issued to Y. Toshimichi, and in U.S. Pat. No. 4,764,755 issued to D. F. Pedtke and G. E. Behlke. Here, the output of a single pair of detector elements is threshold detected to sense excursions above and below preset threshold levels. Such excursions occur as a moving target moves through the field of view of each detector element. For each excursion of the detector element output above threshold, a pulse is produced. These pulses are counted by a counting circuit, and an alarm signal is generated only in the event the number of pulses counted exceeds a preset number within a certain time interval. The higher the required pulse count and/or the shorter the time interval, the more immune the system is to false alarms. For high immunity from false alarms, a pulse count of three is required. To reach this count, either the target must pass through the field of view of one of the two detector elements twice, or the target temperature must be so different from ambient as to produce a "ringing" pulse which, like the normal pulses produced by the respective detector elements, has an amplitude exceeding the preset threshold.

SUMMARY OF THE INVENTION

In view of the foregoing, an object of this invention is to provide a single channel detector which is capable of producing, under normal circumstances, three output pulses in response to the movement of a target through a single detection zone.

Another object of this invention is to provide a three element, single channel pyroelectric detector which is non-responsive to spurious sources affecting all elements simultaneously, i.e., exhibits common mode rejection.

Another object of this invention is to provide a relatively low-cost passive infrared detection system which is particularly immune from false alarming.

According to one aspect of the invention, there is provided a single-channel, multielement, pyroelectric detector comprising a polarized pyroelectric member having three pair of spaced electrodes disposed thereon, each electrode pair comprising first and second electrodes positioned on opposite sides of the pyroelectric member. The electrode pair, together with that portion of the pyroelectric member disposed therebetween, defining one of three infrared radiation-sensitive elements. The three elements are arranged in a linear array, the middle element being operative to produce, in response to a change in rate of radiation incident thereon, an electrical signal of a polarity opposite to that produced by elements on each side thereof. Preferably, the effective surface areas of electrodes comprising the middle element is substantially equal to the sum of the effective surface areas of the end elements, thereby providing common mode rejection of spurious sources seen simultaneously by all three elements.

According to a second aspect of this invention, there is provided a passive IR detection system comprising the combination of the aforementioned single channel, three element pyroelectric detector of the present invention, and the aforementioned pulse-counting signal processing circuitry of the prior art.

The invention and its advantages will become more apparent to those skilled in the art from the ensuing detailed description of preferred embodiments, reference being made to the accompanying drawings.

DETAILED DESCRIPTION OF PREFERRED EMBODIMENTS

Figures 1, 2A, 2B:
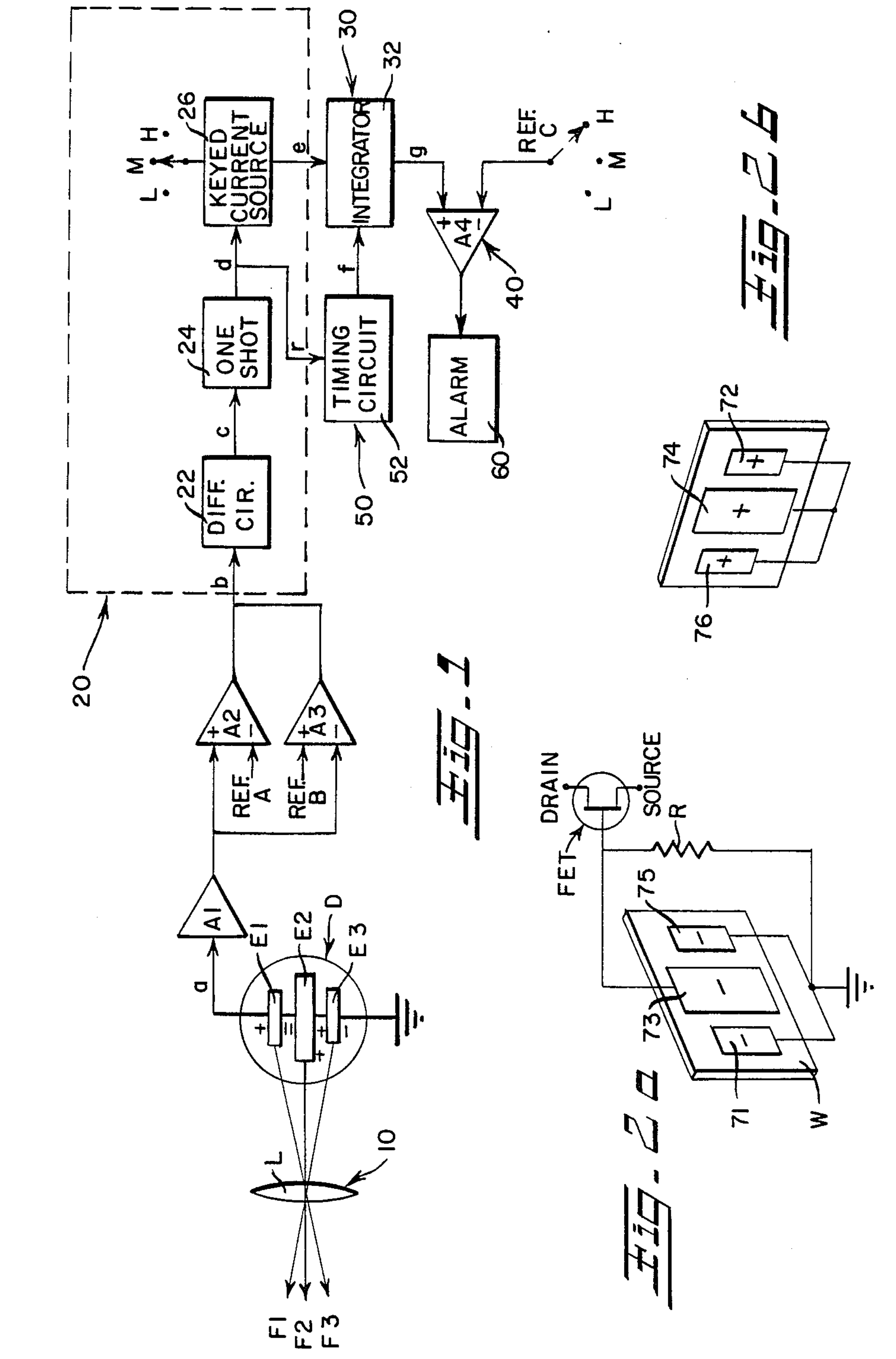
FIG. 1 is a schematic illustration of a presence detection system embodying the invention.
FIGS. 2A and 2B are diagrammatic views of the front and back surfaces of the pyroelectric detector of the invention.

Referring now to the drawings, the schematic illustration of FIG. 1 illustrates a passive infrared presence detection system embodying the invention. Such system comprises an optical system 10, shown for the sake of convenience as a lens L, for focusing infrared (IR) radiation emanating from a space under surveillance onto a single-channel, three-element pyroelectric detector D. The details of the detector, of course, constitute an important aspect of this invention, and they are best described with reference to the other drawings. For the present description of the detection system of the invention, however, it suffices to say that the detector comprises three spaced pyroelectric elements E1, E2 and E3, each element cooperating with the optical system to provide the detection system with multiple, discrete fields of view, in this case fields F1, F2 and F3. Each detector element functions to produce a signal proportional to the time rate of change of IR radiation incident thereon. By virtue of the manner in which the elements are electrically connected (or by virtue of the direction in which the pyroelectric material comprising each element is polarized), the middle element E2 produces a signal of polarity opposite that of the end elements E1 and E3. Thus, as a target (e.g., an intruder) sequentially passes through fields F1, F2 and F3, the pyroelectric detector produces a multi-pulse signal at its output a. Such signal comprises a first pulse of a first polarity, followed by a second pulse of opposite polarity, followed by a third pulse of the same polarity as the first pulse. Also, a fourth pulse will be occasionally produced as the crystal lattice of the pyroelectric material (described below) restores to equilibrium. Whether this happens depends on the initial level of incident energy.

The output of detector D is suitable amplified by a high gain bandpass amplifier A1, which filters out frequencies uncharacteristic of the target of interest. The amplifier output is connected to the positive and negative inputs of a pair of differential amplifiers A2 and A3, respectively, which operate as comparators. The negative terminal of amplifier A2 is connected to a positive reference voltage, REF. A, and the positive terminal of amplifier A3 is connected to a negative reference voltage, REF. B. Amplifiers A2 and A3 provide a threshold-sensing function, assuring that the pulses produced by the respective detector element outputs exceed certain minimum levels (determined by the reference voltages) before the system will consider such outputs target-produced. The output b of amplifiers A2 and A3 will go positive whenever either the output of amplifier A1 is so positive that it exceeds REF. A, or is so negative that it exceeds the negative reference voltage REF. B.

The remaining signal processing circuitry shown in FIG. 1 is of the type adapted to activate an alarm, open a door, etc. only in the event the output of the detector exceeds the thresholds set by REFs. A and B a predetermined number of times within a predetermined time interval. Basically, such circuitry comprises the combination of current pulse-generating means 20, integrating means 30, threshold-sensing means 40 and timing means 50. Current pulse generator 20 functions to produce a current pulse of constant pulsewidth each time the detector output breaks through the thresholds set by the reference voltages. Integrator 30 functions to integrate the current pulses provided by pulse generator 20, and timing means 50 sets the time interval over which integrator 20 can accumulate and store charge. If, within the time interval set by timing means 50, the integrator fails to accumulate a charge which exceeds the threshold level (REF. C) of the threshold-sensing means 40, no alarm signal is produced. The trailing edge of the timing pulse f serves to abruptly discharge the charge stored by the integrator, and a new time interval is established by the next pulse produced by the detector. The operation of this signal-processing circuitry is better described in the above-mentioned U.S. Pat. No. 4,764,755, the disclosure of which is incorporated herein by reference.

As noted in the above-referenced U.S. Pat. No. 4,764,755, current pulse generating means 20 may comprise a conventional differentiating circuit 22 which eliminates certain noise components present in the output of the threshold-sensing amplifiers A1 and A2. The output c of the differentiating circuit is in the form of a spike each time the output of amplifiers A2 and A3 goes positive. This occurs, of course, each time the detector output a breaks out of the voltage range defined by the threshold levels of REFs. A and B. The output of differentiator 22 triggers a conventional one-shot (multivibrator) 24 which, when triggered, provides a pulse of predetermined pulse width. The one-shot output d serves the dual function of initiating (or resetting) the timing signal f provided by the timing circuit 52, and of keying a current source 26 to produce a current pulse of the same pulsewidth as the one-shot output. The amplitude of the pulse produced by the current pulse generator may be adjustable (nominally, high H, medium M and low L) to provide a means for adjusting the system sensitivity. The output e of the current pulse generator is integrated by integrating means 30 which may comprise a conventional RC network 32, and the integrated output g thereof serves as one input to threshold-sensing means 40. The latter may take the form of a differential amplifier A4.

As indicated above, when the integrator output g exceeds a certain threshold determined by the other input of the threshold sensor, i.e. REF. C, an alarm relay 60, or the like, is energized. If, however, the alarm threshold is not exceeded by the integrator output within the time interval defined by timing circuit 50, the charge on the integrator is dumped, i.e., discharged to the normal rest state, e.g. ground. The output of timing circuit 50 may be in the form of a pulse of predetermined pulsewidth, such pulsewidth establishing a time window during which, as noted above, the integrator output must exceed the requisite threshold for alarm activation. It is particularly important that the time window be reset to zero (i.e., a new time interval initiated) each time a current pulse is received by the timing circuit. By this arrangement, certain types of false alarms can be avoided.

As indicated earlier herein, the degree to which the aforedescribed detection system is immune to false alarms is largely dependent on the number of pulses produced by the detector in response to a normal movement of a target of interest. The more pulses available for processing, the better the target signature, and the fewer the false alarms. According to one aspect of the invention, there is provided a single-channel, pyroelectric detector which is capable of providing at least three pulses in response to normal movement of a target, even in the case where the target temperature is nearly the same as ambient, in which case the afore-mentioned "ring" pulse may not be of an amplitude to exceed the threshold set by REFs. A and B.

As shown in FIGS. 2A and 2B, a preferred form of the pyroelectric detector of the invention comprises a single wafer W of pyroelectric material which supports three pair of elongated electrodes, 71,72; 73,74; and 75,76, on its opposing surfaces. The pyroelectric material may be any of the known materials exhibiting the pyroelectric effect (i.e., a material exhibiting a change in voltage across its thickness in response to experiencing a temperature change. Suitable materials include polyvinylidene fluoride, lithium tantalate, and lead zirconate titanate. These materials are typically polarized at an elevated temperature in a high electric field. The polarization process is well known and, hence, need not be described herein. The polarity of the voltage produced in response to temperature changes is determined by the direction of polarization. Preferably, the wafer is uniformly polarized in one direction throughout. Alternatively, the wafer could be polarized in opposite directions between adjacent electrode pairs, in which case the electrode connections described below would be slightly different. Obviously, wafer W could comprise three separate wafers, one being positioned between each electrode pair.

Figure 3:
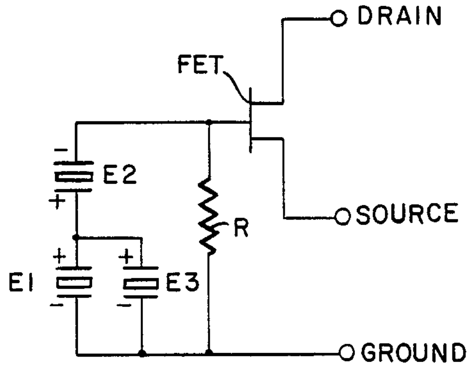
FIG. 3 is an electrical schematic of the detector shown in FIGS. 2A and 2B.

The electrode pairs are arranged on opposite sides of the pyroelectric wafer, each electrode pair together with that portion of the pyroelectric wafer disposed therebetween defining one of the pyroelectric elements E1, E2 and E3. Preferably, the pyroelectric elements are arranged in a linear array, the elements being sized and spaced so as to cover the same area as a conventional two element detector. The sizes of the electrodes are chosen so that, on each side of the wafer, the area of the middle electrode is substantially equal to the sum of the areas of the outside electrodes. In this manner, a good common mode balance is provided. Assuming the pyroelectric wafer is uniformly polarized in the same direction, the outside elements E1 and E3 are connected in parallel, and in series opposition with the middle element. Owing to this connection scheme, the middle element produces a pulse of a polarity opposite that of the outside elements. An electrical schematic of the detector shown in FIGS. 2A and 2B is shown in FIG. 3.

As shown, the positive electrodes 72, 74, and 76 are connected together. The negative center electrode 73 is connected directly to the gate of a field-effect transistor (FET), and outside electrodes 71 and 75 are grounded. The FET gate is ground referenced through the gate resistor R. Note, if the pyroelectric material between the adjacent electrode pairs were polarized in opposite senses, that is, that portion of the wafer between the middle electrode pair were polarized in a direction opposite that portion of the wafer between the end electrode pairs, then all three detector elements could simply be connected in parallel. In this case, the middle element would produce an output signal of polarity opposite the end elements.

Figure 4A:
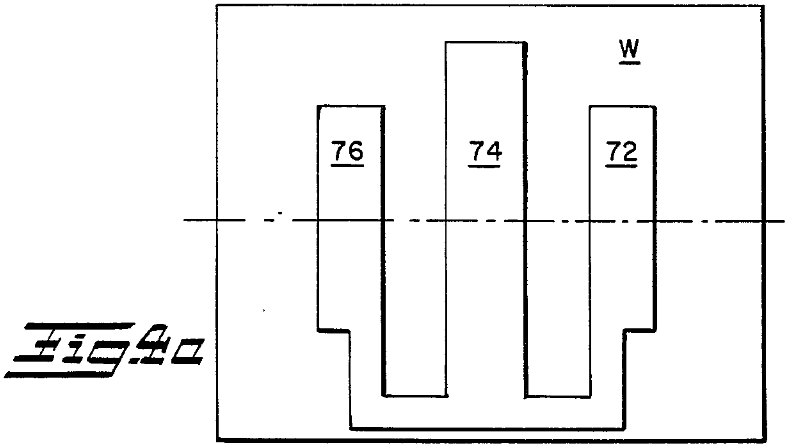
FIGS. 4A and 4B are front and back side elevations, respectively, illustrating preferred electrode patterns for the three element detector of the invention.
Figure 4B:
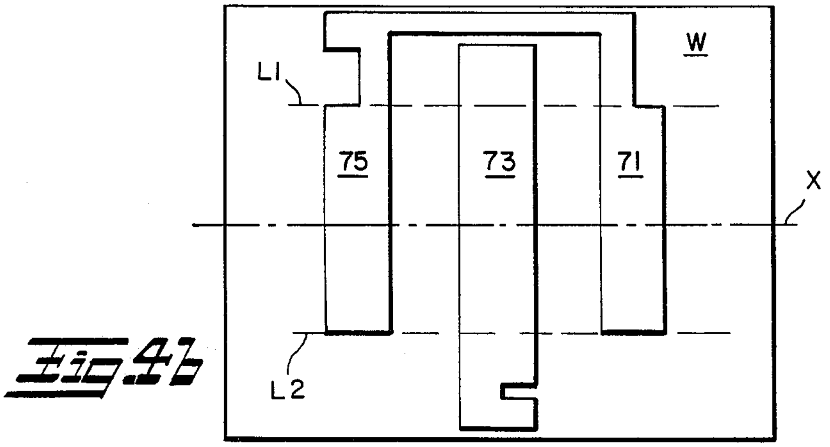

A particularly preferred electrode configuration is shown in FIGS. 4A and 4B. Only those portions of the electrodes between lines L1 and L2 are exposed to IR radiation from target space. Preferably, the "effective" portion of the center electrode (i.e., that portion exposed to radiation in target space) measures 0.7 mm.×3.4 mm., and the effective portion of each of the outside electrodes measures 0.6 mm.×2.0 mm. Also preferred, is that the surface area of that portion of the center electrode which is not exposed to target space (i.e., that portion used for electrical connections, etc.) is substantially equal in size to the similarly non-exposed portions of the end electrodes. This configuration also minimizes the effects of internal common mode noise. The IR-effective portions of the electrodes are centered vertically on the X axis window center line. The outside electrodes are spaced about 0.6 mm. from the middle electrode so that the overall width of the detector is about 3.1 mm. The electrode thickness is about 10 microns, and the wafer thickness depends on the material, typically of the order of 0.5 mm.

The primary advantage of the detector described above is that it provides a greater number of output signals for a given amount of motion as compared to the conventional two-element devices. Also, it lends itself to use with signal processing circuitry of the pulse-counting type. Settings of at least three required pulses for alarm activation provides a very significant improvement in environmental immunity. The detector of the invention can, in combination with a single lens or mirror, be used to provide presence detection along a narrow corridor, or can be used in a multielement optical system to provide broad coverage in a plurality of detection zones.

While the invention has been described with reference to preferred embodiments, obvious variations will suggest themselves to skilled artisans and such variations are intended to be within the scope of the following claims.

I claim:

1. A passive infrared detection system for detecting infrared radiation-producing targets in a region under surveillance, said system comprising an infrared radiation-sensitive pyroelectric detector adapted to produce a time-varying output signal in response to a change in the level of incident infrared radiation, an optical system for focusing infrared radiation from a region under surveillance onto said detector, and signal-processing means operatively coupled to said detector for producing an indication signal in the event said time-varying output signal exceeds a predetermined threshold level a predetermined number of times within a preset time interval, characterized in that said detector comprises a wafer of pyroelectric material having three pairs of spaced electrodes disposed thereon, each electrode pair comprising first and second electrodes disposed on opposite sides of said wafer, said electrode pairs, together with that portion of the wafer disposed therebetween, defining three active infrared radiation-sensitive detector elements, each of said elements being responsive to infrared radiation produced by such targets to provide an output signal, said elements being electrically connected so that their respective output signals provide a single combined output signal.

2. The invention as defined in claim 1 wherein one of said detector elements is adapted to produce, in response to a change in incident radiation, an output signal of a polarity opposite the polarity of an output signal produced by either of the other two detector elements in response to the same change in incident radiation.

3. The invention as defined by claim 2 wherein the sum of the effective surface areas of the electrodes comprising said other elements substantially equals the effective surface area of the electrodes comprising said one detector element.

4. The invention as defined in claim 1 wherein said detector elements are arranged in a linear array, the middle element of said array being operative to produce, in response to a change in incident radiation, an output signal of a polarity opposite the polarity of an output signal produced by the adjacent elements in response to the same change in incident radiation.

5. The invention as defined in claim 4 wherein said wafer is uniformly polarized and wherein said adjacent elements are connected in parallel and in opposition with said middle element.

6. The invention as defined in claim 4 wherein the width of said array is approximately 3 mm.

7. The invention as defined by claim 1 wherein each of the electrodes comprising one of said elements has approximate dimensions of 0.7 mm. by 3.4 mm, and each of the electrodes of the other two elements has approximate dimensions of 0.6 mm. by 2.0 mm.

8. A multielement pyroelectric detector for use in a passive infrared detection system for detecting infrared radiation-producing targets, said detector comprising a wafer of pyroelectric material having three pairs of spaced electrodes disposed thereon, each electrode pair comprising first and second electrodes disposed on opposite sides of said wafer, said electrode pairs, together with that portion of the wafer disposed therebetween, defining three active infrared radiation-sensitive detector elements, each of said elements being operative to produce an electrical signal in response to target-produced infrared radiation being incident thereon, said elements being connected to produce a single combined output signal.

9. The invention as defined in claim 8 wherein one of said detector elements is operative to produce, in response to a given change in incident radiation, an output signal of polarity opposite the polarity of an output signal produced by either of the other two detector elements in response to the same change in incident radiation.

10. The invention as defined in claim 9 wherein said wafer is uniformly polarized and wherein said other elements are connected in parallel and in opposition with said one element.

11. The invention as defined by claim 9 wherein the sum of the effective surface areas of the electrodes comprising said other two detector elements substantially equals the effective surface area of the electrodes comprising said one detector element.

12. The invention as defined in claim 8 wherein said detector elements are arranged in a linear array, the middle element of said array being operative to produce, in response to a change in incident radiation, an output signal of a polarity opposite the polarity of an output signal produced by the adjacent elements in response to the same change in incident radiation.

13. The invention as defined in claim 12 wherein the width of said array is approximately 3 mm.

14. The invention as defined by claim 8 wherein the effective areas of each of the electrodes comprising one of said elements has approximate dimensions of 0.7 mm. by 3.4 mm, and wherein the effective area of each of the electrodes of the other two elements has approximate dimensions of 0.6 mm. by 2.0 mm.

15. A multielement pyroelectric detector for use in a passive infrared detection system for detecting infrared radiation-producing targets, said detector comprising three equally spaced pairs of electrodes, each electrode pair having a pyroelectric member disposed therebetween, whereby three pyroelectric detector elements are defined by said electrode pairs and the pyroelectric member associated therewith, two of said detector elements being operative to produce, in response to a given change in incident radiation received from a target, an output signal having a polarity opposite the polarity of an output signal produced by the third detector element in response to incident radiation received from such target.

16. The invention as defined in claim 15 wherein said detector elements are arranged in a linear array, the middle element of said array being operative to produce, in response to a change in incident radiation, said output signal of polarity opposite the polarity of the output signal produced by the adjacent elements.

17. The invention as defined in claim 16 wherein the width of said array is approximately 3 mm.

18. The invention as defined in claim 15 wherein said pyroelectric members are uniformly polarized and wherein said two detector elements are connected in parallel and in opposition with said third element.

19. The invention as defined by claim 15 wherein the sum of the effective surface areas of the electrodes comprising said two detector elements substantially equals the effective surface area of the electrodes comprising said third detector element.

20. The invention as defined in claim 15 wherein the pyroelectric member of one of said detector elements is polarized opposite that of the pyroelectric member of the other two elements, and wherein said electrode pairs are connected in parallel.

* * * * *